Figure 1:
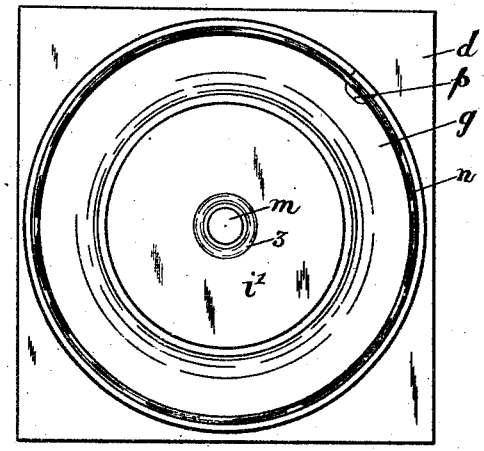

Aug. 18, 1925.

A. G. COOKE ET AL 1,550,150

DRY GAS METER

Filed May 25, 1923

Witnesses.
W Bayly.
E. H. Bayly.

Inventors.
Albert George Cooke.
Benjamin Charles Phillips.
per John Pitt Bayly.
Attorney.

Patented Aug. 18, 1925.

1,550,150

UNITED STATES PATENT OFFICE.

ALBERT GEORGE COOKE AND BENJAMIN CHARLES PHILLIPS, OF BRIGHTON, ENGLAND.

DRY GAS METER.

Application filed May 25, 1923. Serial No. 641,522.

*To all whom it may concern:*

Be it known that we, ALBERT GEORGE Cooke and BENJAMIN CHARLES PHILLIPS, both British subjects, residing at Cambridge Grove, Wilbury Road, Hove, Brighton, in the county of Sussex, England, have invented new and useful Improvements in or Relating to Dry Gas Meters, of which the following is a specification.
This invention relates to certain new and useful improvements in gas bellows applicable to dry gas meters, and has for one of its objects to provide a simple and efficient means of attaching the flexible material of the diaphragm to the rim.

Another object of our invention is to provide an improved gas bellows, whereby the diaphragm can easily be attached or detached from the tapered rim.
A further object of our invention is to eliminate the cracking and puncturing of the flexible diaphragm as hitherto known to occur by the action of the gas bellows.

A still further object of our invention is to provide a gas bellows, wherein the component parts require very little skill in assembling, and the capacity of the gas bellows can be adjusted to suit any type of dry gas meter.
Our invention consists of a tapered sheet metal rim which is slotted to allow the gas to egress by the action of the gas bellows in the usual manner, and is provided with an annular groove or recess on the interior at a suitable distance from the outer edge, which latter is turned out at right angles for the purpose as hereinafter described.

On each side of the partition provided in a dry gas meter, we mount one of the aforesaid rims by means of the conical end turned outwards to form a flange whereby a sound and gastight joint is procured.

The detachable diaphragm is made from leather, or any other suitable flexible material of a greater diameter than the metallic rim, for adjusting the capacity of the bellows to suit any particular type of dry gas meter, said leather or the like is stitched over a wire ring, and interposed between two metallic discs having the peripheral edge turned over to obviate chamfering of the flexible material, and are held in position by a threaded lug and nut passing through the center of the discs and flexible material respectively.

The aforesaid discs have a small annular groove in the form of a male and female wherein the leather or the like is compressed to prevent leakage which has been known to occur at the point where the lug passes through.

The detachable diaphragm is placed over the tapered rim and after adjustment is affixed thereto by means of a split ring inserted into the annular recess, and the respective ends of the split ring are juxtapositioned by a suitable tool engaging in a countersink at each end of the ring, whereby the flexible material is held between the rim and the split ring giving a gastight joint without the puckering of the material.

Figure 2:
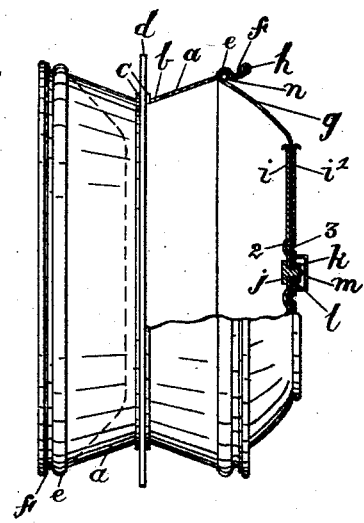
Figure 3:
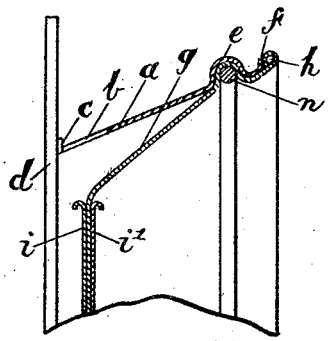
Figure 4:
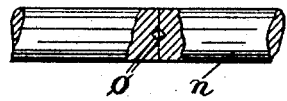

In the accompanying drawings Fig. 1, is a front view of the gas bellows; Fig. 2, is a side view partly in section of Fig. 1; Fig. 3, is an enlarged sectional detail shewing the method of fixing the diaphragm to the tapered rim, and Fig. 4, is an enlarged detail of the split ring.

Our invention comprises two metallic tapered shaped rims $a$, having the gas passage at $b$, and their conical end is turned outwards to form a flange $c$, and soldered on to a partition $d$, provided in a dry gas meter as shewn in Fig. 2. An annular groove or recess $e$, is stamped or swaged near the end remote from the said partition $d$, and the outer ends $f$ of the said rims $a$, are incurvated outwards for the purpose as hereinafter set forth.

The flexible diaphragm actuating as the gas bellows is composed of leather or the like $g$, of a large diameter which outer edge is stitched on to a wire ring $h$, and the central part of which is interposed between two metallic discs $i$, and $i^1$ having their peripheral edges turned away from the said leather $g$, to prevent the latter from being perforated by the action of the bellows. Said discs $i$, and $i^1$, are secured in position by means of a threaded lug $j$, soldered to the inner disc $i^1$, prior to fixing the diaphragm, passing through an orifice $l$, provided in the center of the diaphragm and engaging with a nut $k$, as shewn in Fig. 3.

To ensure a gastight joint at the center of the diaphragm, we swage an annular groove 2, and 3, of a small diameter in the discs $i$, and $i^1$, respectively, whereby the leather $g$, is compressed therein when the nut $k$, is screwed on to the lug $j$.

Over the aforesaid nut $k$, we lightly solder a sheet metal cap $m$, giving a neat and finished appearance to the diaphragm.

The above described diaphragm is placed over the tapered rim $a$, and after being adjusted is connected thereto by a split ring $n$, inserted over the leather $g$, into the recess $e$, the ends overlapping allow easy insertion of the said ring $n$, and adjustment of the bellows to the requisite capacity, and the ends of the split ring $n$, are forced into juxtaposition by means of a suitable tool engaging in a countersink $o$, in the said ends, whereby the ring is expanded and is forced into contiguity as shewn in Fig. 1.

A tongue or extension piece $p$, is provided to prevent the leather $g$, from being penetrated by the ends of the aforesaid split ring $n$, when the latter is attached or detached, and giving a gas tight joint, and at the same time eliminating any puckering or puncturing of the flexible material.

The object of having the rims $a$, tapered allows for easy access and fixing of the split ring $n$, and to assist in emptying the gas chamber thoroughly.

From the foregoing description it will be readily seen and understood that there is no puckering or creasing of the leather or the like $g$, which is entirely prevented from cracking and causing a leakage of gas by the action of the diaphragm as hitherto known to occur.

The wired edge and surplus material of the diaphragm rests upon or over the edge of the rim $a$.

The above described diaphragm can easily be detached from the rim $a$, by disengaging the split ring $n$, from the annular recess $e$, by means of a suitable tool whereby the said diaphragm can then be lifted off and examined when desired.

We claim.

1. In a dry gas meter, a gas bellows, a sheet metal partition, two rims soldered thereto, each of said rims provided with a gas outlet and a circumferential groove near the outer end which latter is curved outwards, a removable diaphragm partly of a flexible material with a wired edge, two discs each having an annular groove and a central orifice, said flexible material interposed between said discs and secured at the center, a split ring with a depression in its respective ends adapted to fit in said circumferential groove over the removable diaphragm.

2. In a dry gas meter, a gas bellows, a sheet metal partition, two tapered rims with the conical ends turned outwards and soldered on each side of said partition, each of said rims provided with a gas outlet and a circumferential groove near the outer end, which latter is curved, a removable diaphragm partly of a flexible material with a wired edge, two discs each provided with an annular groove and a central orifice, said flexible material interposed between said discs being secured at the center by means of a lug and nut, a split ring with a depression in its respective ends adapted to fit in said circumferential groove over said removable diaphragm.

3. In a dry gas meter, a gas bellows, a sheet metal partition, two rims soldered thereto, each of said rims provided with a gas outlet and a circumferential groove near the outer end which latter are curved outwards, a removable diaphragm partly of a flexible material with a wired edge, an extension piece stitched to said wired edge, two discs each provided with an annular groove and a central orifice, said flexible material interposed between said discs and secured at the center by means of a threaded lug secured to the inner discs, and a nut screwed on over said outer disc, a cap soldered over said nut to the outer disc, a split ring with a depression in its respective ends adapted to fit in said circumferential groove over said diaphragm.

ALBERT GEORGE COOKE.
BENJAMIN CHARLES PHILLIPS.